United States Patent [19]

Grant

[11] 4,417,687
[45] Nov. 29, 1983

[54] MULTI-BLADE AUTOMATIC AIR REGISTER DAMPER

[76] Inventor: Willie T. Grant, 400 S. Simms St., Lakewood, Colo. 80228

[21] Appl. No.: 385,765

[22] Filed: Jun. 7, 1982

[51] Int. Cl.³ .............................................. F24F 13/10
[52] U.S. Cl. ................................. 236/9 A; 98/121 A; 49/84
[58] Field of Search .................... 236/9 A, 11; 49/74, 49/78, 82, 84, 51; 98/121 A

[56] References Cited

U.S. PATENT DOCUMENTS

| | | | |
|---|---|---|---|
| 1,014,058 | 1/1912 | Goldberg | 49/82 X |
| 2,271,487 | 1/1942 | Nessell | 236/9 A |
| 3,236,171 | 2/1966 | Vaskov et al. | 49/51 |
| 3,746,042 | 7/1973 | Finkel | 49/84 X |
| 4,184,288 | 1/1980 | Magill et al. | 49/84 X |
| 4,275,762 | 6/1981 | Field | 98/121 A X |
| 4,294,283 | 10/1981 | Scharres | 251/305 X |

FOREIGN PATENT DOCUMENTS 619144 7/1926 France ........................... 49/78

Primary Examiner—William E. Tapolcai

[57] ABSTRACT

An automatically controlled multi-blade damper device for use in air registers installed over furnace duct boots terminating in recesses of floors, ceilings, or walls of dwellings; said boots being part of a central heating and/or air conditioning system. The several damper blades are attached to a gear train and pivotably mounted in a damper housing assembly; said blades being rotatable between open and closed positions by motor driven damper blade attached to gear means and motor means; said motor means, electrically connected to furnace control means and to individual room thermostat, cooperate to maintain the preferred temperature environment in subject room.

9 Claims, 5 Drawing Figures

MULTI-BLADE AUTOMATIC AIR REGISTER DAMPER

In residential dwellings employing floor, wall, and- /or ceiling air registers as part of a central heating and- /or air conditioning system, said registers generally provide for control of air movement into each room by means of manually operated damper mechanisms. When it is required to modify the atmospheric temperature in selected rooms or zones and not in other spaces of aforesaid dwellings, associated damper means in room air registers must be manually adjusted to regulate movement of air into subject rooms.

As centrally located thermostat responds to temperature demand of control zone, air conditioning means become operable for the purpose of modifying the zone temperature through the movement of conditioned air from the furnace and/or air conditioner means to all rooms having open damper plates in aforesaid air registers.

The obvious shortcomings of the existing control and regulatory system involve the inability to monitor and control the temperatures in several rooms or zones simultaneously and the need to manually adjust each air register damper when it is required to add or remove rooms from the heating/cooling flow stream.

SUMMARY OF THE INVENTION

The present invention, incorporating air registers having direct motor driven, multiple blade dampers controlled by individual room thermostats, overcomes these and other limitations and restrictions of the manually operated register dampers where a centrally located thermostat controls the furnace means. The multiple blade dampers, having a direct drive motor mechanism, are interconnected by multiple gear arrangement through which the motor driven damper blade provides movement to adjacent blades through said gear means; and all blades are rotated simultaneously by means of gear interaction.

The complete air register device, including grille bars, damper housing, rotatable damper blades, motor means, and gear means, is constructed to be inserted in a floor, wall, or ceiling recess at the terminal end of a furnace duct boot for the purpose of automatically regulating air flow into subject room, thereby controlling room temperature through thermostatic means partial to said room or control zone.

Advantages of multiple blade automatic air registers include those heretofore stated, as well as ease of installation in new and existing structures, economy in capital costs, and the capability of said system to permit automatic control of temperature in each room independently of any and all other rooms in aforesaid dwelling.

It is preferred that the present device be constructed from materials that are compatible with the specific atmosphere and general operating conditions normally associated with forced air heating/cooling systems; and that said device be constructed to provide a smooth flow path for the conditioned medium with minimal obstruction to flow.

One of the objectives of the present invention is to provide an automatically operated multi-blade damper register; said blades rotatable between open and closed positions by motor means.

Another objective is to provide an automatic damper device to be installed in floor, wall, and ceiling recesses above furnace duct boots, said device independently controlling air flow through associated register.

Another objective is to provide an automatic damper system in which each damper is controlled by independent thermostatic means; said thermostatic means being the same means that simultaneously controls the heating/cooling cycle of central furnace means.

Another objective is to provide an independently controlled automatic damper system having ease of installation and affordability for homeowners.

These and other objects and advantages of the subject invention will become apparent after considering the following detailed specification and accompanying drawings which cover a preferred embodiment, wherein.

Figure 1:
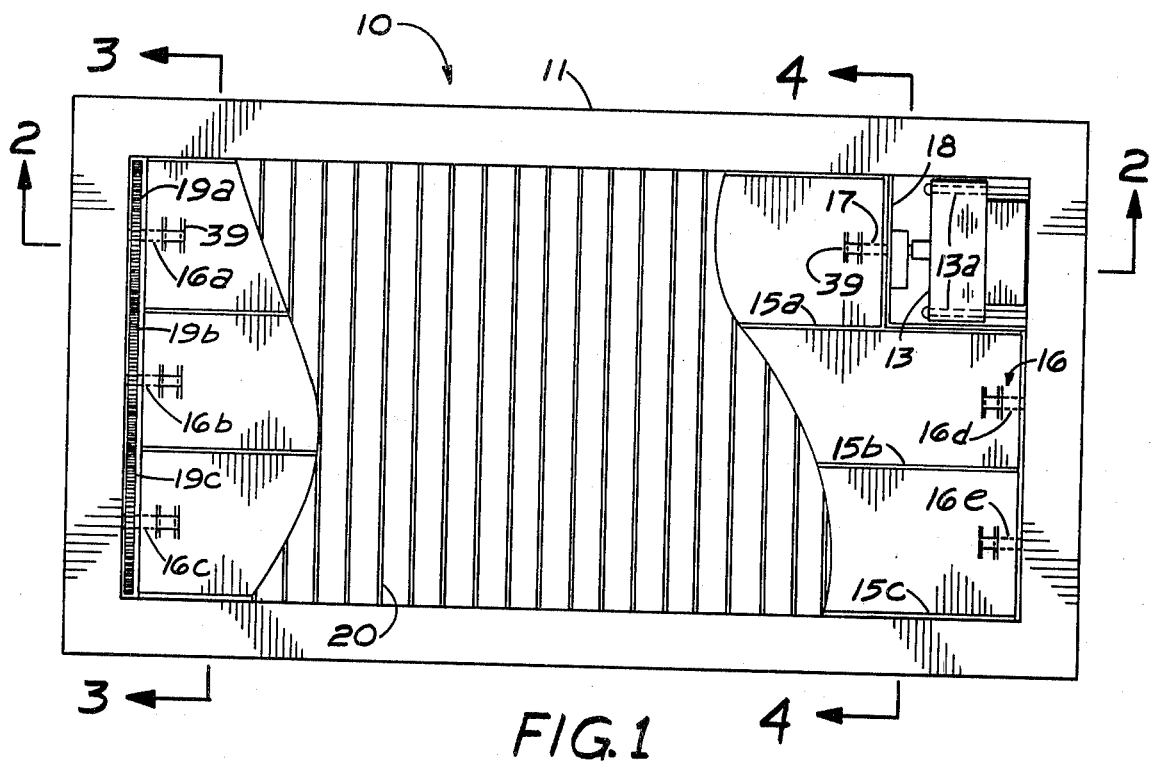
FIG. 1 is a plan view of the automatic multi-blade register damper device constructed according to the present invention.

Referring to the drawings and specific views by reference numbers, FIG. 1 shows an automatic direct drive, multiple blade damper device 10 constructed according to the present invention. Subject device includes a damper housing 11 for installation in a floor, wall, or ceiling recess 44 in the proximity of furnace duct boot 12, partially shown in dashed outline in FIG. 2. Grille bars 20, forming a grille network, cover the space across the top section of housing 11 for the purpose of supporting loads that might rest on or pass over said housing and for directing flow medium in a preferred distribution pattern.

Figure 3:
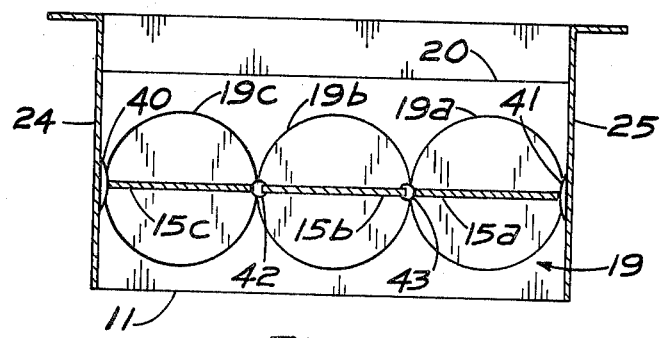
FIG. 3 is a cross-sectional view along line 3—3 of FIG. 1.
Figure 4:
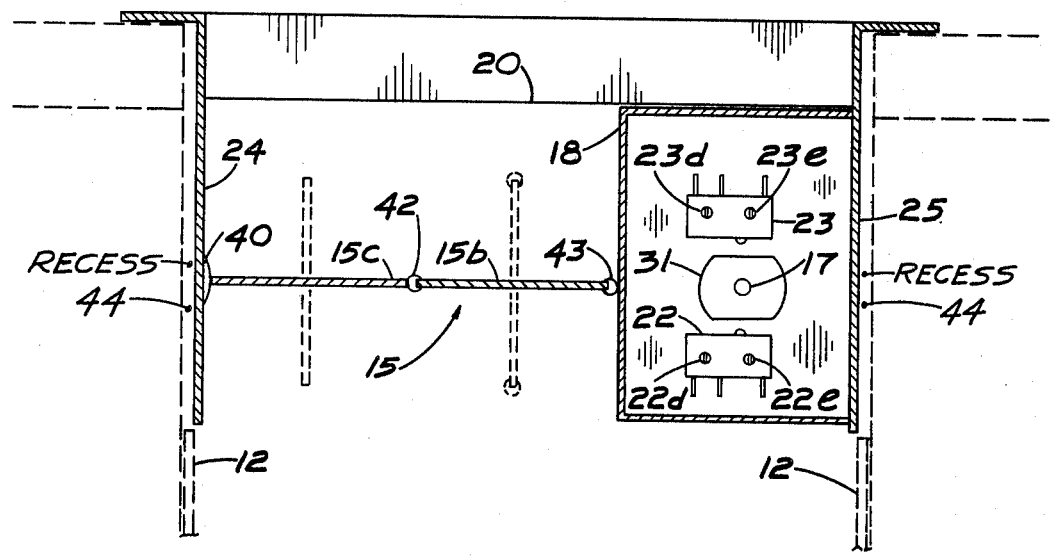
FIG. 4 is a cross-section along line 4—4 of FIG. 1.
Figure 5:
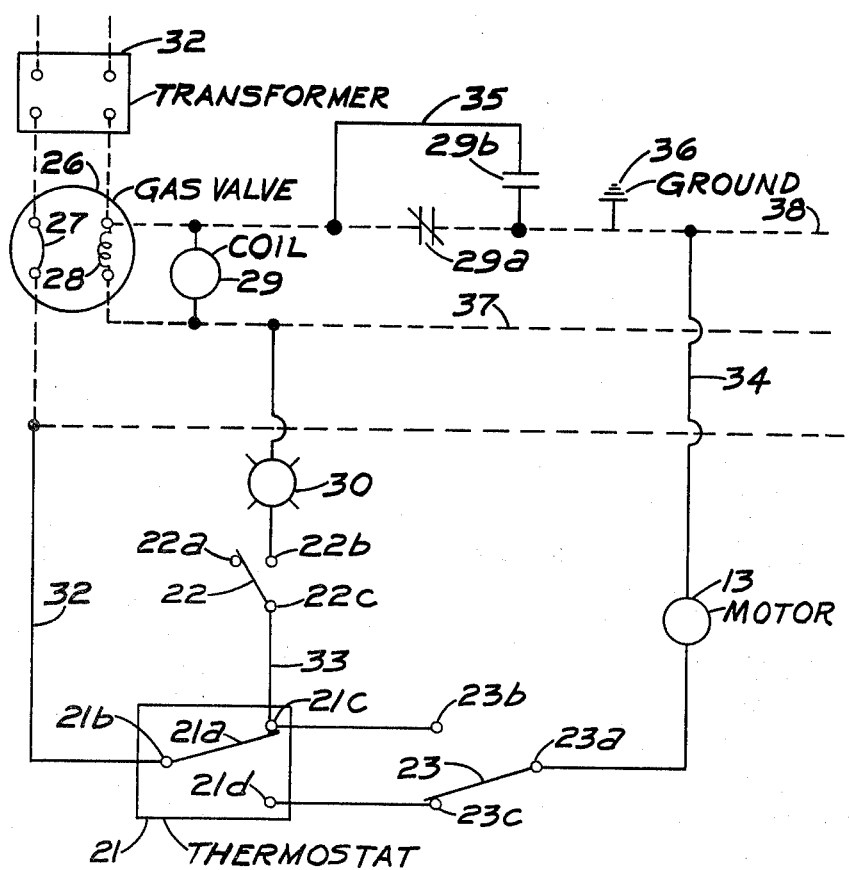
FIG. 5 shows the electrical circuit diagram of the present invention and the interface with an associated furnace device.

As shown in FIGS. 1 through 4, the interior space of housing 11 is occupied by rotatable damper mechanism 15; said mechanism comprised of damper blades 15a through 15c and rotatable between open and closed positions by motor means 13 electrically connected to room thermostat 21 (FIG. 5). Through typical slot 39 in end of damper blade 15a, motor shaft 17 is inserted to support said blade and provide rotational inertia that urges subject blade to rotate from the present position to the preferred condition when motor 13 is energized by means of thermostat 21. On opposite end of damper blade 15a, identical slot 39 intercepts bearing pin 16a of bearing support means 16; said pin cooperating to capture gear 19a of gear train 19 and provide support to aforesaid damper plate 15a.

Said gear 19a meshes with gear 19b which is meshed with gear 19c (FIGS. 1 and 3). Aforesaid gears comprise a gear train 19, whereby drive gear 19a, fixedly connected to driven damper plate 15a, influences gears 19b and 19c, secured to respective damper plates 15b and 15c, to rotate in a circular path and move said damper plates from the present to the preferred position, subject plates being attached to and supported by bearing pins 16b through 16e when said pins are inserted into damper plate slots 39.

When room thermostat 21 instructs furnace means to enter a heating/cooling mode, motor means 13 rotate subject damper plates to the open position shown by dashed outline in FIG. 4, permitting furnace blower to transfer heating/cooling medium into said room. When thermostat 21 has been satisfied, said thermostat commands motor means 13 to rotate damper valves 15a through 15c to the closed position, thereby sealing off subject room from further air transmission as said damper plates reside in aforesaid closed position.

In said closed position, outside damper plates 15a and 15c have their respective edges in contact with air sealing means 40 and 41 attached to housing panels 24 and 25, respectively, of damper housing 11 for the specific purpose of substantially restricting air movement into said room as described heretofore. Air sealing means 42 and 43 attached to leading and trailing edges of interior damper plate 15b capture adjacent edges of outside damper plates 15a and 15b to completely restrict air passage between said damper plates; the primary purpose of said air sealing means being substantially and completely to restrict air movement between subject damper plates when said plates are in a closed position.

Motor means 13, housed in motor cover 18, are secured to housing panel 14 by means of fasteners 13a (FIG. 2); motor shaft 17 projects through cover 18 for the purpose of capturing damper blade 15a, being secured to said blade for rotational and supporting requirements. Subject motor cover 18 (FIG. 2), protects damper control mechanism from dust and dirt particles that may be carried by heating/cooling medium as said medium passes through open damper and around motor means 13. In addition to protecting from particle contamination, said motor cover 18 serves as an insulator to minimize the transfer of heat from aforesaid heating-/cooling medium to enclosed motor 13, thereby maintaining said motor at a lower operating temperature than otherwise possible during furnace combustion cycle. Additionally, motor cover 18 provides support means for switches 22 and 23 through associated fasteners 22d, 22e, and 23d, 23e.

Figure 2:
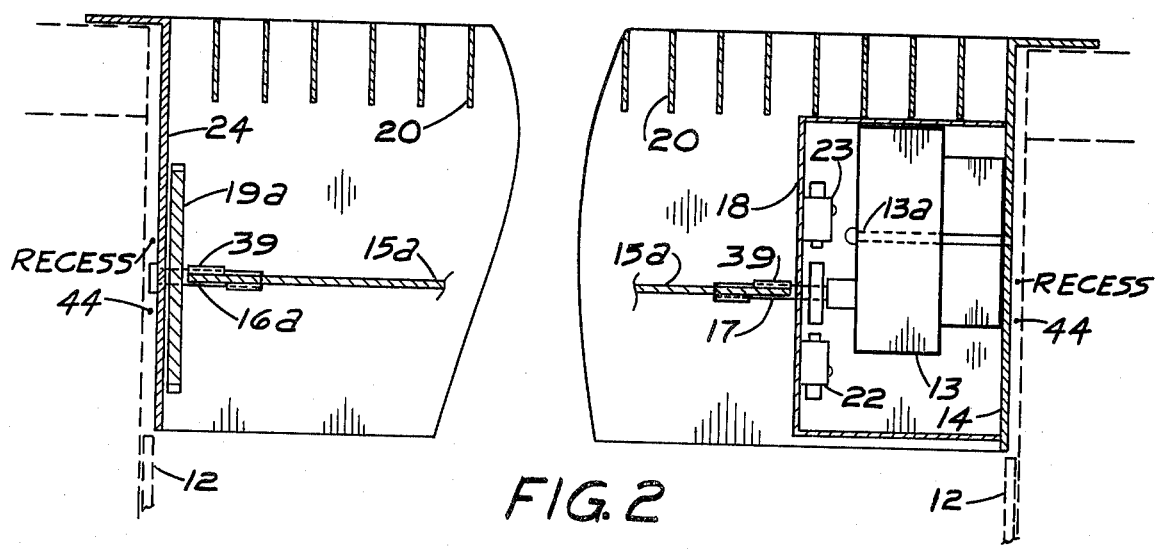
FIG. 2 is a longitudinal view taken along line 2—2 of FIG. 1.

Said switches, shown in FIGS. 2 and 4 and schematically in FIG. 5 are operated by cam 31 attached fixedly to motor shaft 17. Switch 22 inserted in conductor 33 in series with thermostatic switch 21a, indicator lamp 30, and solenoid 28 functions as a secondary control to prevent furnace means, represented by gas valve 26, from entering an operational mode prior to motor 13 opening blades of damper mechanism 15. Switch 23 (FIG. 5), connected in series with thermostatic switch 21a and motor 13, permits said motor to be self-starting in response to commands from room thermostat 21.

During the heating season, when room temperature, controlled by aforesaid thermostat 21, falls below a preset level, thermostatic switch 21a closes contacts 21b–21c to complete the circuit containing thermostat 21, switch 23 (contacts 23a–23b are currently closed as a result of prior rotation of cam 31 by motor 13), motor 13, and contacts 29a associated with coil 29. As said motor is energized, shaft 17 rotates cam 31 and damper plate 15a, thereby moving all damper blades to the open position in preparation for the heating cycle of furnace means; said cam influences switch 22 to the closed condition; and urges switch 23 to close contacts 23a–23c. Aforesaid closing of switch 22, in series with closed thermostatic contacts 21b–21c and circuit indicator lamp 30, energizes solenoid 28 and forces furnace to enter a heating cycle.

Simultaneously, a coil 29 is energized, said coil, opens normally closed time-delay contacts 29a and closed normally open contacts 29b; subject coil remains energized as long as current flows in conductor 37 by means of the control system shown in FIG. 5, or as a result of identical control systems connected in parallel and exerting independent influence over furnace means.

When last room in dwelling, undergoing a temperature adjustment, has its thermostatic requirements satisfied, thermostatic switch 21a opens contacts 21b–21c, de-energizes coil 29 (no current flowing in conductor 37), and concurrently opens previously closed instantaneous contacts 29b. Simultaneously, the countdown for time-delay contacts 29a begins as thermostatic switch 21a closes contacts 21b–21d; said switch intent on completing the series circuit, incorporating closed contacts 23a–23c, motor 13, and time-delay contacts 29a, at precisely the moment said countdown expires and time-delay contacts 29a close. When said contacts close, motor 13 is energized and rotates shaft 17 to close damper plates 15a through 15c, and opens switch 22 by rotating cam 31 in preparation for next heating demand by room thermostat; cam 31 likewise influences switch 23 to open contacts 23a–23c for the purpose of de-energizing motor means 13, thereby terminating damper rotation when said damper plates are in closed position, thus, preventing heating medium from entering subject room whenever furnace means are required by other room(s) to initiate a heating cycle.

The time-delay mechanism that includes coil 29, time-delay contacts 29a, and instantaneous contacts 29b operates as previously explained to maintain damper plates, in last room undergoing temperature adjustment, in an open position to permit furnace fan to transport residual conditioned air from furnace box into said room after combustion cycle has terminated.

With the ability to close individual room dampers through separate thermostatic means, use of the subject device permits individual, personal selection of room temperatures and individual maintenance of room comfort, resulting in fuel cost savings in winter and reduced operating costs for air conditioning means in summer, including central air conditioning equipment such as might be a part of the furnace installation or a separately installed system.

Thus, there has been shown and described an improved motorized automatic damper device which fulfills all the objects and advantages sought after; it being understood, however, that the form of the invention herein described and shown is to be taken as the preferred embodiment. Many changes, modifications, variations, other uses, and applications of the present device will become apparent to those skilled in the art after considering this specification and accompanying drawings. All such changes, modifications, variations, other uses, and applications which do not depart from the spirit and scope of the invention are deemed to be covered by the invention which is limited only by the claims which follow:

I claim:

1. Damper means automatically controlling the flow of a heating/cooling medium through ducts of a heating/cooling device, said ducts terminating in room floor, wall, or ceiling registers, said damper means comprising combinationally:
    (a) housing means having end panels and side panels forming an enclosure with angular support means, said end panels receiving bearing pins supporting gear means of transmission means and damper blades of flow control means; said panels receiving grille bars spanning the top of said enclosure;
    (b) said flow control means being comprised of air sealing means and multiple damper blades rotatably supported in said enclosure by said bearing pins and a motor shaft, said bearing pins having attachment combinationally to said gear means and said damper blades;

(c) said transmission means comprising motor means and said gear means, said motor means having an integral shaft, with attaching cam, connecting to a driver blade of said damper blades, transmitting motor rotation from said motor means to other said damper blades, all said blades being interconnected by said gear means;

(d) electrical control means energizing and controlling said motor means of said transmission means and a fuel control device of said heating/cooling device, said electrical control means being comprised of thermostatic means electrically connecting relay means and said motor means to said fuel control device through switch means and light means; said relay means comprising first contacts operable by means of a coil, and second contacts operable by a time delay device.

2. The housing means defined in claim 1 wherein each said panel has an extremity angularly positioned to an axis of said panel forming said support means; said grille bars connecting to said panels providing covering means for said flow control means, transmission means, and switch means.

3. The air sealing means set forth in claim 1, being of compressible material, bonding to said panels and said damper blades.

4. The flow control means defined in claim 1, having said damper blades, with air sealing means, connecting to said gear means through said bearing pins, and to said motor means via said motor shaft, said flow control means being rotated by said motor means.

5. The gear means of said transmission means set forth in claim 1 forming a gear train, said gear train having a single gear attaching to each of said damper blades and said driver blade by means of said bearing pins, said motor connecting to said driver blade and rotating said gear train and said flow control means.

6. The electrical control means of claim 1 having said thermostatic means comprising a switch connecting said motor means to said relay means and said fuel control device through said light means, said motor means rotating said flow control means to an open position when said switch is in a first position; a second position of said switch deenergizing said fuel control device, and said relay means, and cooperating with said motor means to retain said flow control means in an open position until said time delay relay operates to close a set of contacts.

7. Damper means automatically adjusting the temperature in individual rooms or spaces in response to thermostatic demand, said damper means including:

(a) housing means having an open bottom section, and a top section enclosed by a grille network, said grille network attaching to panels, said panels forming a perimeter and providing support for said housing means, said housing means enclosing flow control means, transmission means, and a portion of electrical control means;

(b) said flow control means comprising a multiplicity of damper blades and compressible air sealing means, said damper blades, conjunctionally with gear means, attaching to bearing pins and rotatably mounted in said housing means;

(c) said transmission means providing rotation to open and close said flow control means mounted in said housing means, said transmission means being comprised of motor means having a shaft attaching to one blade of said damper blades; said gear means attaching to said damper blades through said bearing pins;

(d) said electric control means having a thermostatic switch providing an electrical interlock between said motor means, a fuel control device, and relay means; said interlock including light means communicating the status of a heating/cooling device controlled by said thermostatic means, and switch means comprising a two-way switch, and a one-way switch.

8. The motor means defined in claim 7 having a cam attaching to said motor shaft, said cam operating said switch means.

9. The relay means set forth in claim 7 comprising a relay coil, a set of coil contacts, and a time delay device having contacts; said coil contacts being operable when said thermostatic means energizes said relay coil and said fuel control device.

* * * * *